(12) United States Patent
Klein et al.

(10) Patent No.: US 11,673,374 B2
(45) Date of Patent: Jun. 13, 2023

(54) LAMINATED PANE WITH FUNCTIONAL ELEMENT HAVING ELECTRICALLY CONTROLLABLE OPTICAL PROPERTIES

(71) Applicant: SAINT-GOBAIN GLASS FRANCE, Courbevoie (FR)

(72) Inventors: Marcel Klein, Baesweiler (DE); Florian Manz, Aachen (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 362 days.

(21) Appl. No.: 16/761,704

(22) PCT Filed: Nov. 5, 2018

(86) PCT No.: PCT/EP2018/080127
§ 371 (c)(1),
(2) Date: May 5, 2020

(87) PCT Pub. No.: WO2019/086653
PCT Pub. Date: May 9, 2019

(65) Prior Publication Data
US 2021/0178731 A1 Jun. 17, 2021

(30) Foreign Application Priority Data
Nov. 6, 2017 (EP) .................................... 17200089

(51) Int. Cl.
*B32B 17/10* (2006.01)
*B32B 3/18* (2006.01)
(Continued)

(52) U.S. Cl.
CPC .......... *B32B 17/10504* (2013.01); *B32B 3/18* (2013.01); *B32B 17/10036* (2013.01);
(Continued)

(58) Field of Classification Search
CPC ................ B32B 3/18; B32B 17/10504; B32B 17/10036; B32B 17/10293;
(Continued)

(56) References Cited

U.S. PATENT DOCUMENTS

2008/0280076 A1 11/2008 Hayes et al.
2015/0301367 A1* 10/2015 Mennig ............. B32B 17/10761
156/60

(Continued)

FOREIGN PATENT DOCUMENTS

CN 106457779 A 2/2017
DE 10 2005 007427 A1 8/2006
(Continued)

OTHER PUBLICATIONS

International Search Report as issued in International Patent Application No. PCT/EP2018/080127, dated Jan. 23, 2019.
(Continued)

*Primary Examiner* — Catherine A. Simone
(74) *Attorney, Agent, or Firm* — Pillsbury Winthrop Shaw Pittman LLP (57) ABSTRACT

A laminated pane with a functional element with electrically controllable optical properties, includes a laminated stack sequence composed of an outer pane, a first intermediate layer, a second intermediate layer, and an inner pane, and a functional element with electrically controllable optical properties, which functional element is arranged, at least in sections, between the first intermediate layer and the second intermediate layer, wherein at least one transparent body is arranged between the outer pane and the functional element and/or between the inner pane and the functional element in sections.

19 Claims, 7 Drawing Sheets

(51) Int. Cl.
  *B60J 1/00* (2006.01)
  *B60J 3/04* (2006.01)
(52) U.S. Cl.
  CPC .. *B32B 17/10293* (2013.01); *B32B 17/10339* (2013.01); *B32B 17/10431* (2013.01); *B32B 17/10761* (2013.01); *B60J 1/001* (2013.01); *B60J 3/04* (2013.01)
(58) Field of Classification Search
  CPC ........ B32B 17/10339; B32B 17/10431; B32B 17/10761; B60J 3/04; B60J 1/001; B60J 1/02; B60J 1/00
  See application file for complete search history.

(56) References Cited

U.S. PATENT DOCUMENTS

| | | |
|---|---|---|
| 2016/0325528 A1 | 11/2016 | Berard et al. |
| 2017/0090224 A1 | 3/2017 | Vivier |

FOREIGN PATENT DOCUMENTS

| | | |
|---|---|---|
| DE | 10 2005 049081 B3 | 6/2007 |
| DE | 10 2007 027296 A1 | 12/2008 |
| DE | 10 2008 017895 A1 | 10/2009 |
| DE | 10 2013 001334 A1 | 7/2014 |
| WO | WO 2007/122429 A1 | 11/2007 |
| WO | WO 2009/153593 A1 | 12/2009 |
| WO | WO 2014/029536 A1 | 2/2014 |
| WO | WO 2017/157626 A1 | 9/2017 |
| WO | WO 2018/082920 A1 | 5/2018 |

OTHER PUBLICATIONS

Supplemental Search Report as issued in Chinese Patent Application No. 201880002865.8, dated Oct. 12, 2022.

* cited by examiner

OFF

OFF

LAMINATED PANE WITH FUNCTIONAL ELEMENT HAVING ELECTRICALLY CONTROLLABLE OPTICAL PROPERTIES

CROSS-REFERENCE TO RELATED APPLICATIONS

This application is the U.S. National Stage of PCT/EP2018/080127, filed Nov. 5, 2018, which in turn claims priority to European patent application number 17 200 089.5 filed Nov. 6, 2017. The content of these applications are incorporated herein by reference in their entireties.

FIELD

The invention relates to a laminated pane with a functional element having electrically controllable optical properties and in particular a windshield with an electrically controllable sun visor.

BACKGROUND

In the vehicle sector and in the construction sector, composite panes with electrically controllable functional elements are often used as sun screens or as privacy screens.

Thus, for example, windshields are known in which a sun visor is integrated in the form of a functional element having electrically controllable optical properties. In particular, the transmittance or scattering behavior of electromagnetic radiation in the visible range is electrically controllable. The functional elements are usually film-like and are laminated into or glued onto a composite pane. In the case of windshields, the driver can control the transmittance behavior of the pane itself relative to sunlight. Thus, a conventional mechanical sun visor can be dispensed with. As a result, the weight of the vehicle can be reduced and space can be gained in the roof region. In addition, the electrical control of the sun visor is more convenient than the manual folding down of the mechanical sun visor.

Windshields with such electrically controllable sun visors are, for example, known from DE 102013001334 A1, DE 102005049081 B3, DE 102005007427 A1, and DE 102007027296 A1.

Typical electrically controllable functional elements contain electrochromic layer structures or suspended particle device (SPD) films. Further possible functional elements for realizing an electrically controllable sun screen are so-called PDLC functional elements (polymer dispersed liquid crystal). Their active layer contains liquid crystals that are embedded in a polymer matrix. When no voltage is applied, the liquid crystals are randomly oriented, resulting in strong scattering of the light passing through the active layer. When a voltage is applied on the surface electrodes, the liquid crystals align themselves in a common direction and the transmittance of light through the active layer is increased. The PDLC functional element acts less by reducing total transmittance, but, instead, by increasing scattering to ensure glare protection. Glazings with PDLC functional elements are known, for example, from WO 2007/122429 A1, WO 2014/029536 A1, US 2017/0090224 A1, and WO 2017/157626 A1.

SUMMARY

The object of the present invention is to provide an improved laminated pane with a functional element having electrically controllable optical properties.

The object of the present invention is accomplished by a laminated pane in accordance with the independent claim 1. Preferred embodiments are apparent from the dependent claims.

A laminated pane according to the invention comprises at least:
- a stack sequence composed of an outer pane, a first intermediate layer, a second intermediate layer, and an inner pane, and
- a functional element with electrically controllable optical properties, which functional element is arranged, at least in sections, between the first intermediate layer and the second intermediate layer,
wherein at least one transparent body is arranged between the outer pane and the functional element and/or between the functional element and the inner pane in sections.

In an advantageous embodiment of the laminated pane according to the invention, the transparent body contains or is made of a transparent film, preferably a transparent polymeric film. The transparent film preferably contains or is made of polyethylene terephthalate (PET), ethylene vinyl acetate (EVA), polyvinyl butyral (PVB), polyurethane (PU), polyamide, polyimide, or polyvinylidene fluoride. Such films are particularly advantageous because they have sufficient thermal resistance and do not melt down during a lamination process, and sufficient local, controllable thickening can be achieved.

In an alternative advantageous embodiment of the laminated pane according to the invention, the transparent body contains or is made of a transparent fiber (also referred to as thread or monofilament). Referred to here as monofilament is a fully synthetic thread consisting of a single fiber. The transparent fiber preferably contains or is made of polyethylene terephthalate (PET), ethylene vinyl acetate (EVA), polyvinyl butyral (PVB), polyurethane (PU), polyamide, polyimide, or polyvinylidene fluoride. Such fibers are particularly advantageous because they have sufficient thermal resistance and do not melt down during a lamination process, and sufficient local, controllable thickening can be achieved.

In an alternative advantageous embodiment of the laminated pane according to the invention, the transparent body contains or consists of a printed layer, preferably a transparent layer applied by screen printing or 3D printing. The transparent layer preferably contains or is made of glass, polymers, such as polyethylene terephthalate (PET), ethylene vinyl acetate (EVA), polyvinyl butyral (PVB), polyurethane (PU), polyamide, polyimide, or polyvinylidene fluoride or resins.

In the context of the present invention, "transparent" means having transmittance in the visible light spectrum of more than of more than 30%, preferably of more than 50%, particularly preferably of more than 75%, and in particular of more than 85%.

The transparent body can be clear or have a tint or a coloration, for example, a green, blue, or red coloration.

The transparent body must be sufficiently flat (i.e., have sufficiently low thickness) such that it can be laminated into the interior of a laminated pane. The thickness of the transparent body and in particular the thickness of the transparent film, the transparent thread, or the transparent layer is preferably from 5 μm to 500 μm, particularly preferably from 25 μm to 300 μm, and in particular 25 μm to 150 μm. Such thick bodies can be laminated into laminated panes without undermining or interfering with the stability or the optical properties of the laminated pane.

Particularly advantageous thicknesses of the transparent body depend on its hardness and and can be determined by the person skilled in the art through simple experiments.

Particularly advantageous transparent bodies consist of a polyethylene terephthalate (PET) film with a thickness greater than or equal to 100 µm, preferably from 100 µm to 500 µm, particularly preferably from 125 µm to 500 µm, and in particular from 150 µm to 500 µm.

Alterative particularly advantageous transparent bodies consist of a polyethylene terephthalate (PET) film with a thickness greater than or equal to 100 µm, preferably from 100 µm to 300 µm, particularly preferably from 125 µm to 300 µm, and in particular from 150 µm to 300 µm.

The side edges of the transparent body are preferably sharp-edged, i.e., substantially orthogonal or with a small radius of curvature, particularly in the case of fibers.

Here as well, a polyethylene terephthalate (PET) film is particularly advantageous because, compared to other polymeric films, it is dimensionally very stable and can be cut with sharp edges.

Such sharp-edged transparent bodies exert particularly high pressure on the active layer of the functional element in their edge region in a laminated end product such as a laminated pane and thus locally change its transmittance behavior.

The transparent body according to the invention is arranged, at least in sections, between the functional element and one of the panes one of the panes (i.e., between the functional element and the outer pane or the inner pane). This means that the transparent body is arranged, at least in sections, within the orthogonal projection region of the functional element through the laminated pane (i.e., through the outer pane or the inner pane).

Advantageously, the transparent body is arranged completely within the orthogonal projection region of the functional element through the laminated pane. In particular, the transparent body is arranged completely, i.e., together with all its side edges, completely within the through-vision region of the functional element.

In an advantageous embodiment of the transparent body according to the invention, the area A of the transparent body is less than or equal to 50%, preferably less than or equal to 25%, and in particular less than or equal to 10% of the area of the functional element. The area A of the transparent body is the area in the region of the overlap with the area of a functional element or, in other words, the area in the region of the orthogonal projection of the functional element through the laminated pane. These are, in each case, the regions that are arranged parallel to or in the plane of the laminated pane or their projection areas on the plane of the laminated pane.

In another advantageous embodiment of the transparent body according to the invention, the area A of the transparent body is, in the case of a transparent layer, at least 0.01%, preferably at least 0.1%, and particularly preferably at least 1% of the area of the functional element.

In the case of a thread as a transparent body, the length of the thread is preferably at least 5 cm, particularly preferably at least 10 cm, and in particular at least 20 cm.

Preferably, the transparent body is arranged between the functional element and the first intermediate layer and/or between the functional element and the second intermediate layer, preferably either between the functional element and the first intermediate layer or between the functional element and the second intermediate layer. Particularly preferably, the transparent body is arranged between the functional element and the pane, from which, as a rule and during normal operation, light passes through the laminated pane, i.e., preferably the outer pane. Surprisingly, the effect according to the invention of altered transmittance and light-scattering is particularly pronounced in this arrangement.

In particular, the transparent body is arranged immediately adjacent the functional element. This is particularly advantageous for a transparent film or a transparent thread as a transparent body, since these are particularly easy to place on the intermediate layer or the functional element. Furthermore, the effect according to the invention can develop particularly well on the functional element since the direct pressure differences on the functional element are particularly great in the edge region of the transparent body.

Alternatively, the transparent body is arranged directly on the inner pane or the outer pane. This is particularly advantageous in the case of transparent bodies that are produced by screen printing, since the screen print can be printed particularly well on hard surfaces and subsequently fired particularly well on glass surfaces. The screen print can, however, also be applied to the functional element, the first intermediate layer, the second intermediate layers, or on other intermediate or carrier layers.

The laminated pane can, for example, be the windshield or the roof panel of a vehicle or another vehicle glazing, for example, a glass partition in a vehicle, preferably in a rail vehicle, a ship, or a bus. Alternatively, the laminated pane can be an architectural glazing, for example, in an outer façade of a building or a glass partition in the interior of a building.

The terms "outer pane" and "inner pane" arbitrarily describe two different panes. In particular, the outer pane can be referred to as a first pane; and the inner pane, as a second pane.

In the context of the invention, when the laminated pane is intended, in a window opening of a vehicle or of a building, to separate an interior space from the external environment, the pane (second pane) facing the interior (vehicle interior) is referred to as the "inner pane". The pane (first pane) facing the external environment is referred to as the "outer pane". However, the invention is not limited to this.

The laminated pane according to the invention contains a functional element having electrically controllable optical properties, which is arranged, at least in sections, between a first intermediate layer and a second intermediate layer. The first and second intermediate layer usually have the same dimensions as the outer pane and the inner pane. The functional element is preferably film-like.

In an advantageous embodiment of a laminated pane according to the invention, the intermediate layer contains a polymer, preferably a thermoplastic polymer.

In a particularly advantageous embodiment of a laminated pane according to the invention, the intermediate layer contains at least 3 wt.-%, preferably at least 5 wt.-%, particularly preferably at least 20 wt.-%, even more preferably at least 30 wt.-%, and in particular at least 40 wt.-% of a plasticizer. The plasticizer preferably contains or consists of triethylene glycol-bis-(2-ethylhexanoate).

Plasticizers are chemicals that make plastics softer, more flexible, smoother, and/or more elastic. They shift the thermoelastic range of plastics to lower temperatures such that the plastics have the desired more elastic properties in the range of the temperature of use. Other preferred plasticizers are carboxylic acid esters, in particular low-volatility carboxylic acid esters, fats, oils, soft resins, and camphor. Other plasticizers are preferably aliphatic diesters of tri- or tetraethylene glycol. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol-bis-(2-ethylhexanoate), in other words, a compound of the formula $C_4H_9CH$ $(CH_2CH_3)$ $CO$ $(OCH_2CH_2)_3O_2CCH$ $(CH_2CH_3)$ $C_4H_9$.

In another particularly advantageous embodiment of a laminated pane according to the invention, the intermediate layer contains at least 60 wt.-%, preferably at least 70 wt.-%, particularly preferably at least 90 wt.-%, and in particular at least 97 wt.-% polyvinyl butyral.

The thickness of each intermediate layer is preferably from 0.2 mm to 2 mm, particularly preferably from 0.3 mm to 1 mm, in particular from 0.3 mm to 0.5 mm, for example, 0.38 mm.

The controllable functional element typically comprises a active layer between two surface electrodes. The active layer has the controllable optical properties that can be controlled via the voltage applied to the surface electrodes. The surface electrodes and the active layer are typically arranged substantially parallel to the surfaces of the outer pane and the inner pane. The surface electrodes are electrically connected to an external voltage source in a manner known per se. The electrical contacting is realized by suitable connecting cables, for example, foil conductors, which are optionally connected to the surface electrodes via so-called "bus bars", for example, strips of an electrically conductive material or electrically conductive imprints.

The surface electrodes are preferably designed as transparent, electrically conductive layers. The surface electrodes preferably contain at least a metal, a metal alloy, or a transparent conducting oxide (TCO). The surface electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The surface electrodes preferably have a thickness from 10 nm to 2 μm, particularly preferably from 20 nm to 1 μm, most particularly preferably from 30 nm to 500 nm.

Functional elements according to the invention are often sensitive to diffusion of plasticizers from the intermediate layers into the interior of the functional element with aging, which can lead to brightening or to a change in transmittance in the edge region of the functional element and adversely affect the through-vision and the aesthetics of the laminated pane. Functional elements according to the invention can, for example, have barrier layers or barrier films, in particular on the side surfaces or exit surfaces of the active layer.

In addition to the active layer and the surface electrodes, the functional element can have other layers known per se, for example, barrier layers, blocking layers, antireflective layers, protective layers, and/or smoothing layers.

The functional element is preferably present as a multilayer film with two outer carrier films. In such a multilayer film, the surface electrodes and the active layer are arranged between the two carrier films. Here, the term "outer carrier film" means that the carrier films form the two surfaces of the multilayer film. The functional element can thus be provided as a laminated film that can be processed advantageously. The carrier films advantageously protect the functional element against damage, in particular corrosion. The multilayer film contains, in the order indicated, at least a carrier film, a surface electrode, an active layer, another surface electrode, and another carrier film. The carrier film carries, in particular, the surface electrodes and gives the necessary mechanical stability to a liquid or soft active layer.

The carrier films preferably contain at least one thermoplastic polymer, particularly preferably plasticizer-poor or plasticizer-free polyethylene terephthalate (PET). This is particularly advantageous with regard to the stability of the multilayer film. The carrier films can, however, also contain or consist of other polymers, preferably plasticizer-poor or plasticizer-free polymers, for example, ethylene vinyl acetate (EVA), polypropylene, polycarbonate, polymethyl methacrylate, polyacrylate, polyvinyl chloride, polyacetate resin, casting resins, acrylates, fluorinated ethylene propylenes, polyvinyl fluoride, and/or ethylene-tetrafluoroethylene. The thickness of each carrier film is preferably from 0.01 mm to 1 mm, particularly preferably from 0.1 mm to 0.2 mm.

Typically, the carrier films have in each case an electrically conductive coating that faces the active layer and functions as a surface electrode.

In another advantageous embodiment of a laminated pane according to the invention, the functional element is a PDLC (polymer dispersed liquid crystal) functional element. The active layer of a PDLC functional element contains liquid crystals that are embedded in a polymer matrix. When no voltage is applied on the surface electrodes, the liquid crystals are oriented in a disorderly manner, resulting in strong scattering of the light passing through the active layer. When a voltage is applied on the surface electrodes, the liquid crystals align themselves in a common direction and the transmittance of light through the active layer is increased. Usually, AC voltages in the range from 10 V to 130 V, preferably from 12 V to 50 V, and with frequencies from 10 Hz to 60 Hz are used.

In principle, however, it is also possible to use other types of controllable functional elements, for example, electrochromic functional elements or SPD (suspended particle device) functional elements. The controllable functional elements mentioned and their functionality are known per se to the person skilled in the art such that a detailed description can be dispensed with here.

Functional elements are commercially available as multilayer films. The functional element to be integrated is typically cut in the desired shape and size from a multilayer film with larger dimensions. This can be done mechanically, for example, using a knife. In an advantageous embodiment, the cutting is done by laser. It has been shown that, in this case, the side edge is more stable than with mechanical cutting. With mechanically cut side edges, there can be the risk that the material retracts, so to speak, which is noticeable visually and adversely affects the aesthetics of the pane.

In the context of this invention, the terms "side" and "edge" are used synonymously for extended planar structures, such as a pane, an intermediate layer, a filmlike functional element, or a filmlike transparent body, whose lateral dimension is much greater than its thickness.

The functional element is joined to the outer pane via a region of the first intermediate layer and to the inner pane via a region of the second intermediate layer. The intermediate layers are preferably arranged sheet-wise one over another and laminated together with the functional element inserted between the two layers. The regions of the intermediate layers overlapping the functional element then form the regions that connect the functional element to the panes. In other regions of the pane where the intermediate layers make direct contact with one another, they can fuse during lamination such that the two original layers are possibly no longer recognizable and, instead, there is a homogeneous intermediate layer.

The stack sequence composed of at least an outer pane, a first intermediate layer, a functional element, a second intermediate layer, and an inner pane, as well as the transparent body, is laminated in an autoclave method, a vacuum bag method, a vacuum ring method, a calendar method, by means of vacuum laminators or combinations thereof, i.e., permanently bonded together under pressure or vacuum and elevated temperature.

The invention is based on the finding of the inventors that transparent bodies according to the invention can change the transparency and the scattering behavior of visible light that penetrates through the functional element, in particular in the edge region of the transparent body. The change is discernible in all switching states of the functional element, in particular, even with "clear" switching of the functional element, i.e., in the state of maximum transmittance or scattering.

Without wishing to be bound by a particular theory, this can be explained in a simple model: By laminating a transparent body according to the invention, increased pressure develops in the region of the overlap with the functional element on its active layer. This pressure particularly affects the active layer in the edge region of the transparent body. With PDLC films, a deformation of the liquid crystal droplets in the active layer occurs, which droplets orient themselves differently in the alternating field of the switching voltage than the liquid crystal droplets of the surroundings. This difference occurs at all switching voltages such that the outline of the transparent body remains visible to the human eye due to altered transmittance or scattering behavior over the entire operating region of the functional element. At the same time, the transmittance or scattering behavior can be adjusted, for example, by a suitable selection of the thickness of the transparent body such that the through-vision is only insignificantly impaired and an impression that is only discreet and aesthetic remains.

An intermediate layer can, for example, be formed by a single thermoplastic film. An intermediate layer can also be implemented as a two-ply, three-ply, or multi-ply film stack, wherein the individual films have the same or different properties. An intermediate layer can also be formed from sections of different thermoplastic films whose side edges are adjacent one another.

In an advantageous further development of a laminated pane according to the invention, the region of the first or the second intermediate layer via which the functional element is joined to the outer pane or the inner pane is tinted or colored. The transmittance of this region in the visible spectral range is thus reduced compared to a non-tinted or non-colored layer. The tinted/colored region of the intermediate layer thus reduces the transmittance of the windshield in the region of the sun visor. In particular, the aesthetic impression of the functional element is improved because the tinting results in a neutral appearance that affects the observer more pleasantly.

In the context of the invention, "electrically controllable optical properties" means those properties that are infinitely controllable but also those that can be switched between two or more discrete states.

The electrical control of the sun visor is done, for example, by means of switches, rotary or slide controls that are integrated into the dashboard of the vehicle. However, a switch area for controlling the sun visor can also be integrated into the windshield, for example, a capacitive switch area. Alternatively, or additionally, the sun visor can be controlled by contactless methods, for example, by gesture recognition, or as a function of the state of the pupil or eyelid determined by a camera and suitable evaluation electronics. Alternatively, or additionally, the sun visor can be controlled by sensors that detect incidence of light on the pane.

The tinted or colored region of the intermediate layer preferably has transmittance in the visible spectral range of 10% to 50%, particularly preferably of 20% to 40%. Particularly good results in terms of glare protection and optical appearance are thus obtained.

The intermediate layer can be implemented by a single thermoplastic film, in which the tinted or colored region is produced by local tinting or coloring. Such films can be obtained, for example, by coextrusion. Alternatively, an non-tinted film section and a tinted or colored film section can be combined to form the thermoplastic layer.

The tinted or colored region can be colored or tinted homogeneously, in other words, can have location-independent transmittance. The tinting or coloring can, however, also be inhomogeneous, in particular, a transmittance progression can be realized. In one embodiment, the transmittance level in the tinted or colored region decreases, at least in sections, with increasing distance from the upper edge. Thus, sharp edges of the tinted or colored area can be avoided such that the transition from the sun visor into the transparent region of the windshield is gradual, which appears more attractive aesthetically.

In an advantageous embodiment, the region of the first intermediate layer, i.e., the region between the functional element and the outer pane is tinted. This creates a particularly aesthetic impression when viewing the outer pane from above. The region of the second intermediate layer between the functional element and the inner pane can optionally also be colored or tinted.

The laminated pane having an electrically controllable functional element can advantageously be implemented as a windshield with an electrically controllable sun visor.

Such a windshield has an upper edge and a lower edge as well as two side edges extending between the upper edge and the lower edge. "Upper edge" refers to that edge that is intended to point upward in the installation position. "Lower edge" refers to that edge that is intended to point downward in the installation position. The upper edge is often referred to as the roof edge; the lower edge, as the engine edge.

Windshields have a central field of vision, for which high optical quality requirements are established. The central field of vision has to have high light transmittance (typically greater than 70%). Said central field of vision is, in particular, that field of vision that is referred to by the person skilled in the art as field of vision B, vision area B, or zone B. The field of vision B and its technical requirements are specified in Regulation No. 43 of the United Nations Economic Commission for Europe (UN/ECE) (ECE-R43, "Uniform Provisions concerning the Approval of Safety Glazing Materials and Their Installation on Vehicles"). The field of vision B is defined there in Appendix 18.

The functional element is then advantageously arranged above the central field of vision (field of vision B). This means that the functional element is arranged in the region between the central field of vision and the upper edge of the windshield. The functional element does not have to cover the entire region, but is positioned completely within this region and does not protrude into the central field of vision. In other words, the functional element has a shorter distance from the upper edge of the windshield than the central field of vision. Thus, the transmittance of the central field of vision is not adversely affected by the functional element, which is positioned at a location similar to that of a conventional mechanical sun visor when folded down.

The windshield is preferably intended for a motor vehicle, particularly preferably for a passenger car.

In a preferred embodiment, the functional element, more precisely the side edges of the functional element, is circumferentially surrounded by a third intermediate layer. The third intermediate layer is implemented frame-like with a recess into which the functional element is inserted. The third intermediate layer can also be formed by a thermoplastic film, in which the recess was made by cutting. Alternatively, the third intermediate layer can also be composed of a plurality of film sections around the functional element. The intermediate layer is preferably formed from a total of at least three thermoplastic layers arranged sheet-wise one over another, wherein the middle layer has a recess in which the functional element is arranged. During production, the third intermediate layer is arranged between the first and the second intermediate layer, with the lateral surfaces of all intermediate layers preferably arranged congruently. The third intermediate layer preferably has approx. the same thickness as the functional element. This compensates for the local difference in thickness of the windshield introduced by the locally limited functional element such that glass breakage during lamination can be avoided.

The side edges of the functional element visible when looking through the windshield are preferably arranged flush with the third intermediate layer such that no gap exists between the side edge of the functional element and the associated side edge of the intermediate layer. This applies in particular to the lower edge of the functional element, which is typically visible. Thus, the boundary between the third intermediate layer and the functional element is visually less conspicuous.

In a preferred embodiment, the lower edges of the functional element and of the tinted region of the intermediate layer(s) are adapted to the shape of the upper edge of the windshield, creating a visually more appealing appearance. Since the upper edge of a windshield is typically curved, in particular concavely curved, the lower edge of the functional element and of the tinted region are also preferably curved. Particularly preferably, the lower edges of the functional element are substantially parallel to the upper edge of the windshield. It is, however, also possible to construct the sun visor from two straight halves arranged at an angle relative to each other and approximating the shape of the upper edge in a V shape.

In an embodiment of the invention, the functional element is divided into segments by isolation lines. The isolation lines are in particular introduced into the surface electrodes such that the segments of the surface electrode are electrically isolated from one another. The individual segments are connected to the voltage source independently of one another such that they can be actuated separately. Thus, different regions of the sun visor can be switched independently. Particularly preferably, the isolation lines and the segments are arranged horizontally in the installation position. Thus, the height of the sun visor can be controlled by the user. The term "horizontal" is to be interpreted broadly here and refers to a direction of extension that, in a windshield, runs between the side edges of the windshield. The isolation lines do not necessarily have to be straight, but can also be slightly curved, preferably adapted to any curvature of the upper edge of the windshield, in particular substantially parallel to the upper edge of the windshield. Vertical isolation lines are, of course, also conceivable.

The isolation lines have, for example, a width of 5 μm to 500 μm, in particular 20 μm to 200 μm. The width of the segments, i.e., the distance between adjacent isolation lines can be suitably selected by the person skilled in the art according to the requirements of the individual case.

The isolation lines can be introduced by laser ablation, mechanical cutting, or etching during production of the functional element. Already laminated multilayer films can also be subsequently segmented by laser ablation.

The upper edge and the side edges or all side edges of the functional element are concealed in vision through the laminated pane preferably by an opaque masking print or by an outer frame. Windshields typically have a surrounding peripheral masking print made of an opaque enamel, which serves in particular to protect the adhesive used for installation of the window against UV radiation and to visually conceal it. This peripheral masking print is preferably used to also conceal the upper edge and the side edge of the functional element as well as the necessary electrical connections. The sun visor is then advantageously integrated into the appearance of the windshield and only its lower edge is potentially discernible to the observer.

Preferably, both the outer pane and the inner pane have a masking print such that through-vision is prevented from both sides.

The functional element can also have recesses or holes, for instance, in the region of so-called sensor windows or camera windows. These regions are provided to be equipped with sensors or cameras whose function would be impaired by a controllable functional element in the beam path, for example, rain sensors. It is also possible to realize the sun visor with at least two functional elements separated from one another, with a distance between the functional elements providing space for a sensor window or a camera window.

The functional element (or the totality of the functional elements in the above-described case of a plurality of functional elements) is preferably arranged over the entire width of the laminated pane or of the windshield, minus an edge region on both sides having a width of, for example, 2 mm to 20 mm. The functional element also preferably has a distance of, for example, 2 mm to 20 mm from the upper edge. The functional element is thus encapsulated within the intermediate layer and protected against contact with the surrounding atmosphere and corrosion.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or rigid clear plastics, for example, polycarbonate or polymethyl methacrylate. The panes can be clear, or also tinted or colored. Windshields must have adequate light transmittance in the central field of vision, preferably at least 70% in the primary through-vision zone A per ECE-R43.

The outer pane, the inner pane, and/or the intermediate layer can have further suitable coatings known per se, for example, antireflection coatings, nonstick coatings, antiscratch coatings, photocatalytic coatings, or solar protection coatings, or low-E coatings.

The thickness of the outer pane and the inner pane can vary widely and can thus be adapted to the requirements of the individual case. The outer pane and the inner pane preferably have thicknesses from 0.5 mm to 5 mm, particularly preferably from 1 mm to 3 mm.

The also includes a method for producing a laminated pane according to the invention, wherein at least a) an outer pane, a first intermediate layer, a functional element with electrically controllable optical properties, a second intermediate layer, and an inner pane are arranged one above another in this order, wherein at least one transparent body is arranged between the outer pane and the first intermediate layer, between the first intermediate layer and the functional element, between functional element and the second intermediate layer, and/or between the second intermediate layer and the inner pane, b) the outer pane and the inner pane are joined by lamination.

The lamination is preferably done under the action of heat, vacuum, and/or pressure. Methods known per se can be used for lamination, for example, autoclave methods, vacuum bag methods, vacuum ring methods, calendar methods, vacuum laminators, or combinations thereof.

The electrical contracting of the surface electrodes of the functional element is preferably done before laminating the laminated pane.

Any prints that are present, for example, opaque masking prints or printed bus bars for the electrical contacting of the functional element are preferably applied by screen printing.

The invention further includes the use of a laminated pane according to the invention having an electrically controllable functional element as interior glazing or exterior glazing in a vehicle or a building, wherein the electrically controllable functional element is used as a sun screen or as a privacy screen.

The invention further includes the use of a laminated pane according to the invention as a windshield or roof panel of a vehicle, wherein the electrically controllable functional element is used as a sun visor.

A major advantage of the invention consists in that, with laminated panes as a windshield, a conventional vehicle-roof-mounted, mechanically foldable sun visor can be dispensed with. Consequently, the invention thus also includes a vehicle, preferably a motor vehicle, in particular a passenger car, that has no such conventional sun visor.

Another aspect of the invention includes the use of a transparent body according to the invention in a laminated pane according to the invention for inscribing, for marking, or for symbolically displaying a function or a position within the laminated pane.

BRIEF DESCRIPTION OF THE DRAWINGS

The invention is explained in detail with reference to drawings and exemplary embodiments. The drawings are schematic representations and not true to scale. The drawings in no way restrict the invention. They depict.

DETAILED DESCRIPTION

Figure 1A:
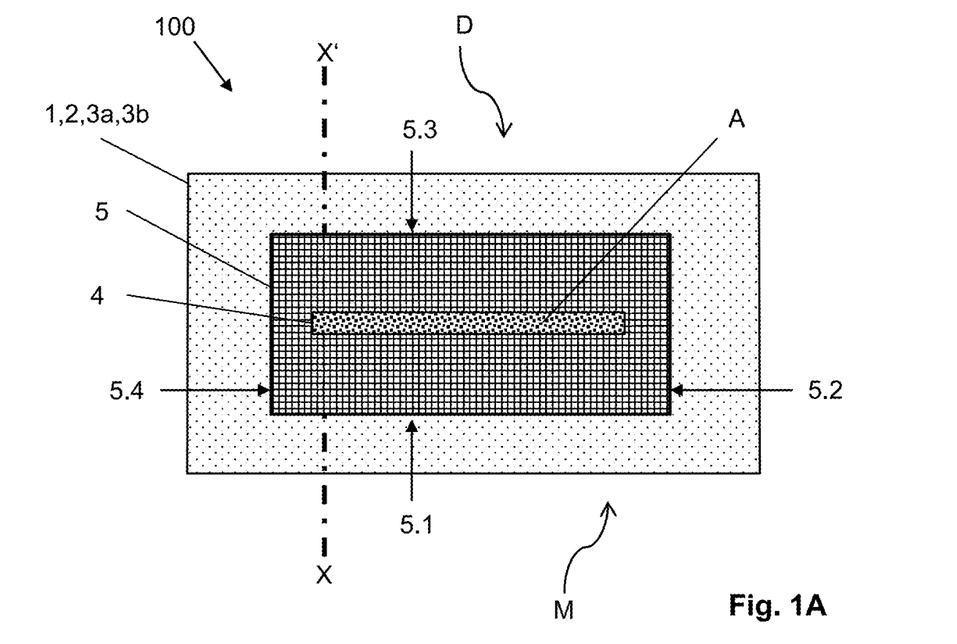
FIG. 1A a plan view of a first embodiment of a laminated pane according to the invention, FIG. 1B a cross-section through the laminated pane of FIG. 1A along the section line X-X', FIG. 1C an enlarged cross-section of the region Z through the laminated pane of FIG. 1B, FIG. 2A-D a view through the laminated pane of FIG. 1A at various operating states of the functional element, FIG. 3A-D a view through an alternative laminated pane according to the invention of FIG. 1A at various operating states of the functional element, FIG. 4A a plan view of another embodiment of a laminated pane according to the invention as a windshield with a sun visor, FIG. 4B a cross-section through the laminated pane of FIG. 4A along the section line X-X', FIG. 5A a plan view of another embodiment of a laminated pane according to the invention as a windshield with a sun visor, FIG. 5B a cross-section through the laminated pane of FIG. 5A along the section line X-X', and FIG. 6 a plan view of another laminated pane according to the invention as a windshield with a segmented sun visor.
Figure 1B:
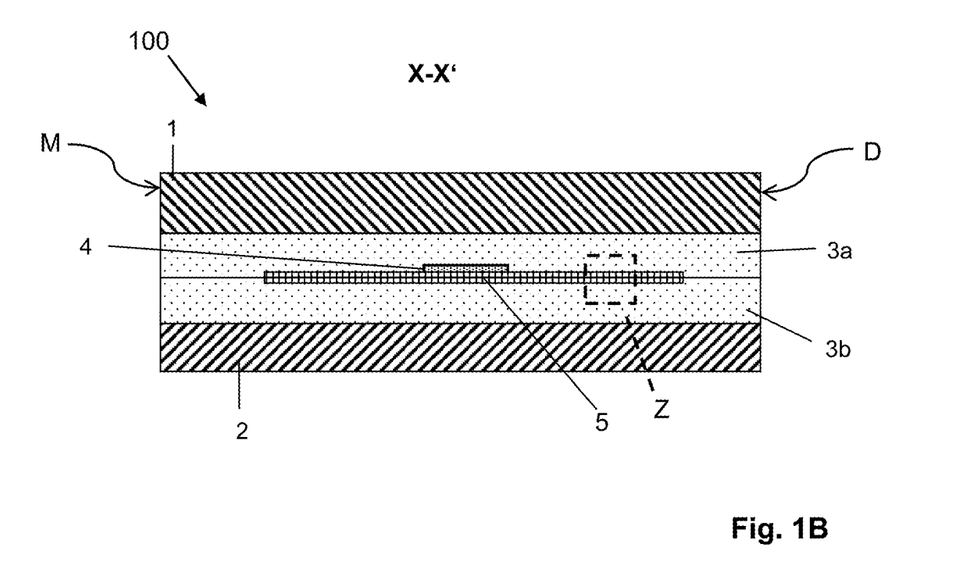

FIG. 1A depicts a plan view of a laminated pane 100 according to the invention; and FIG. 1B, a cross-section along the section line X-X' of FIG. 1A. The laminated pane 100 comprises an outer pane 1 and an inner pane 2 joined via a first intermediate layer 3a and a second intermediate layer 3b. The outer pane 1 has a thickness of 2.1 mm and is made, for example, of a clear soda lime glass. The inner pane 2 has a thickness of 1.6 mm and is likewise made, for example, of a clear soda lime glass. The laminated pane 100 has a first edge referenced with D that is called the "upper edge" in the following. The laminated pane 100 has a second edge referenced with M that is arranged opposite the upper edge D and is called the "lower edge" in the following. The laminated pane 100 can be arranged, for example, as architectural glazing in the frame of a window with other panes to form an insulating glazing unit.

A functional element 5 that is controllable in its optical properties via an electrical voltage is arranged between the first intermediate layer 3a and the second intermediate layer 3b. For the sake of simplicity, the electrical leads are not shown.

Figure 1C:
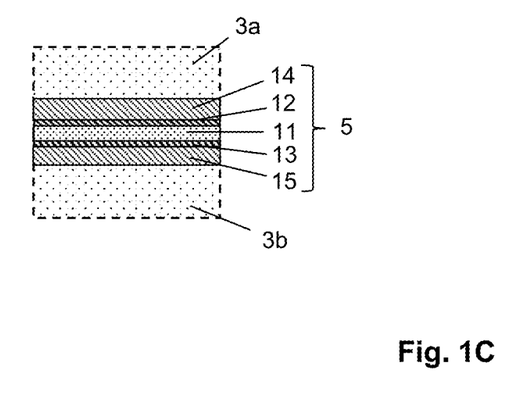

FIG. 1C depicts an enlarged cross-section of the detail Z of FIG. 1B. The controllable functional element 5 is, for example, a PDLC multilayer film consisting of an active layer 11 between two surface electrodes 12, 13 and two carrier films 14, 15. The active layer 11 contains a polymer matrix with liquid crystals dispersed therein that are oriented as a function of the electrical voltage applied on the surface electrodes, by which means the optical properties can be controlled. The carrier films 14, 15 are made of PET and have a thickness of, for example, 0.125 mm. The carrier films 14, 15 are provided with a coating of ITO facing the active layer 11 and having a thickness of approx. 100 nm which form the surface electrodes 12, 13. The surface electrodes 12, 13 can be connected to the vehicle's electrical system via bus bars (not shown) (formed, for example, by a silver-containing screen print) and connection cables (not shown).

The intermediate layers 3a, 3b comprise in each case a thermoplastic film with a thickness of 0.38 mm. The intermediate layers 3a, 3b are made, for example, of 78 wt.-% polyvinyl butyral (PVB) and 20 wt.-% triethylene glycol bis-(2-ethyl hexanoate) as plasticizer.

A transparent body 4 is arranged between the first intermediate layer 3a and the functional element 5. The transparent body 4 consists, for example, of a clear, transparent polymer film and, for example, a PET film with a thickness of 125 μm. The dimensions (area A) of the transparent body 4 in the through-vision direction are significantly smaller than the dimensions (area) of the functional element 5 in the through-vision direction.

The functional element 5 can have special means that seal the side edges 5.1, 5.2, 5.3, 5.4, for example, a barrier film (not shown here), and that prevent the diffusion of plasticizer from the intermediate layers 3a, 3b into the interior of the PDLC film.

The following Table 1 shows test results for transparent bodies 4 made of PET films with different thicknesses (12.5 µm, 25 µm, 50 µm, 125 mm). The changed transmittance properties in the edge region of the transparent body 4 were evaluated in the ON state, i.e., with maximum transparency and clarity of the PDLC film. The changed transmittance properties were evaluated based on the optical impression of a viewer with the human eye in through-vision.

TABLE 1

| Material of the transparent body 4 | Thickness of the transparent body 4 | Changed transmittance properties in the edge region of the transparent body 4 |
|---|---|---|
| PET film | 12.5 µm | Indiscernible |
| PET film | 25 µm | Not/Hardly discernible |
| PET film | 50 µm | Weakly discernible |
| PET film | 125 µm | Readily discernible/clearly pronounced |

For transparent bodies 4 made of PET films with a thickness of 125 µm, particularly readily discernible changes in the transmittance properties were noted.

FIG. 2A-D depict a schematic representation of through-vision through the laminated pane 100 according to the invention of FIG. 1A-C in various operating states of the functional element 5.

Figure 2A:
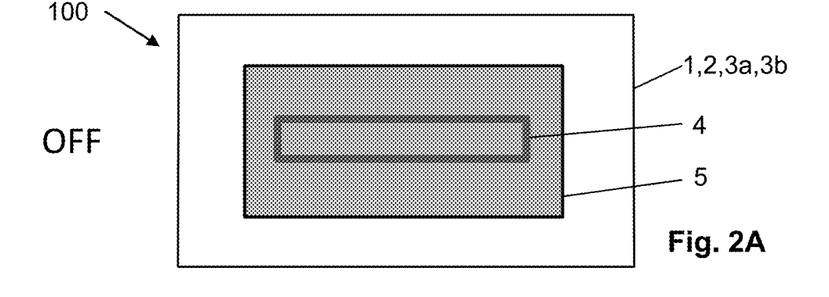
Figure 2B:
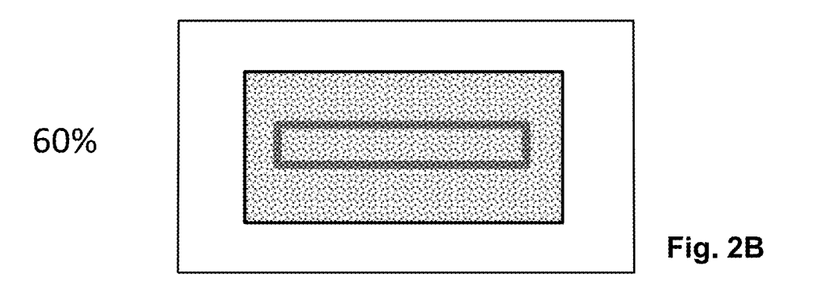
Figure 2C:
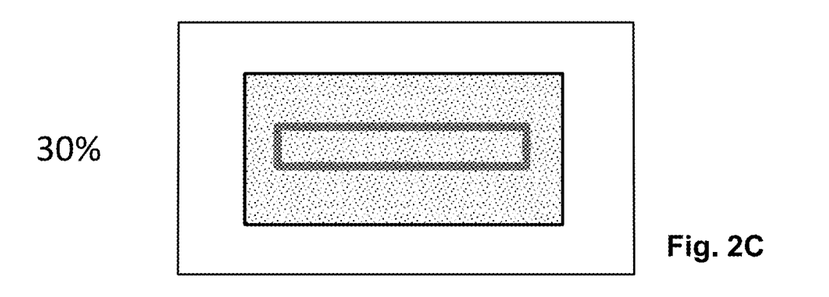

FIG. 2A depicts through-vision in the OFF state of the functional element 5. "OFF state" means that with the PDLC film used, there is no voltage on the PDLC film and the PDLC film causes maximum scattering of the light passing through. The through-vision is cloudy over the entire functional element 5 and light from objects or light sources behind it is scattered and reduced in its intensity. In particular, objects behind it are not recognizable for the human eye.

In the example of the PET film, the transparent body 4 is either not or not substantially distinguishable in its interior by the human eye from the vision through the functional element 5 in the surroundings of the transparent body 4. Only in a narrow region around the edge of transparent body 4 does changed scattering occur such that the outline of the transparent body 4 is readily and clearly discernible by the human eye. This effect is retained when an AC electrical voltage is applied to the PDLC film and the PDLC film is switched to increasing transparency and clarity, see FIG. 2B with 60% residual scattering and FIG. 2C with 30% residual scattering.

Figure 2D:
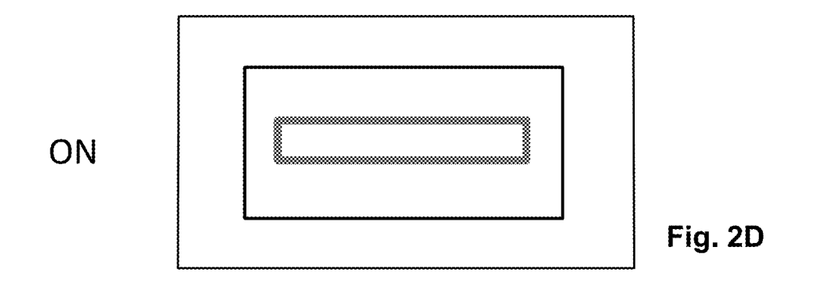
Figure 3A:
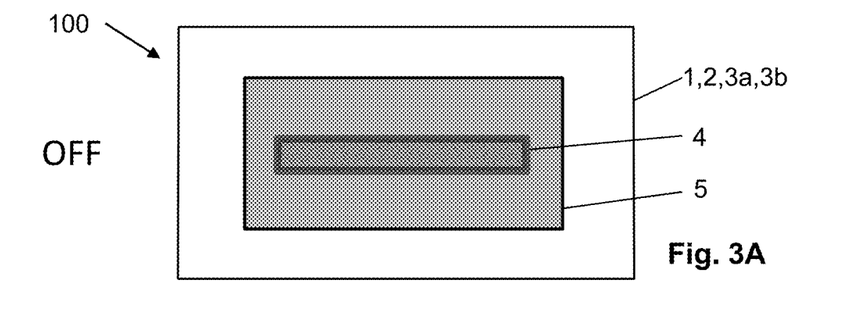
Figure 3B:
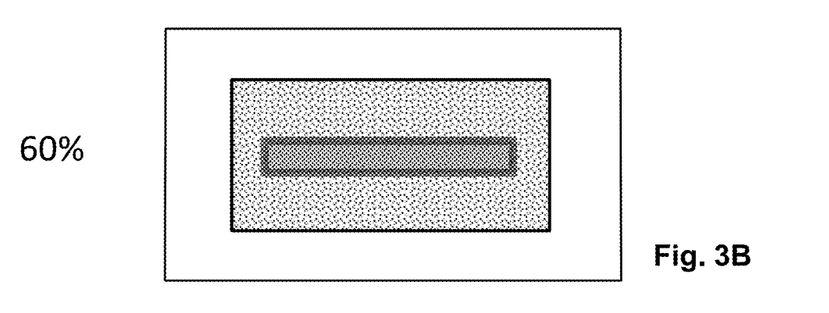
Figure 3C:
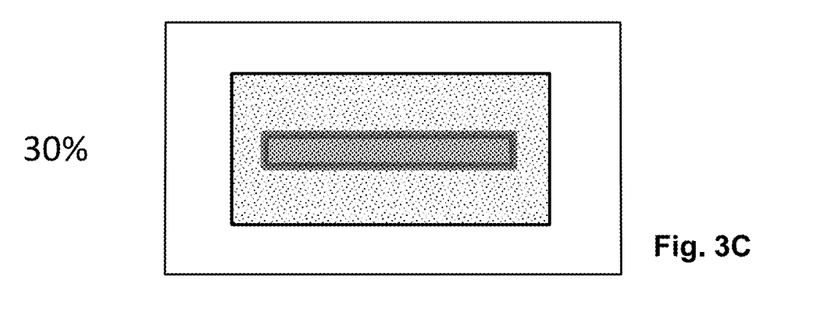
Figure 3D:
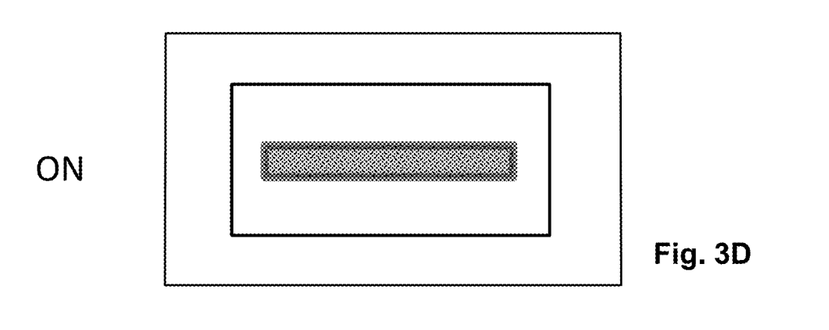

Even in the ON state, i.e., with maximum transparency and clarity of the PDLC film, the outline of the transparent body 4 can still be discerned due to changed transmittance behavior of the PDLC film.

By means of the body 4 according to the invention, discreet but at the same time durable position markings, lettering, or other markings can be introduced into the laminated pane 100.

FIG. 3A-D depict vision through an alternative laminated pane 100 according to the invention in various operating states of the functional element 5. The alternative laminated pane 100 according to the invention corresponds substantially to the laminated pane 100 according to the invention of FIG. 1A such that only differences are discussed in the following.

In the alternative laminated pane 100, the transparent body 4 is a slightly tinted, i.e., for example, green-colored, polyimide film with a thickness of, for example, 50 µm.

The tinted film does not affect the scattering due to the functional element 5 (here, for example, a PDLC-film), but, instead, only gives the light in transmittance a green hue. The outline of the transparent body 4 can be discreetly discerned by a changed scattering behavior corresponding to FIG. 2A-D.

Figure 4A:
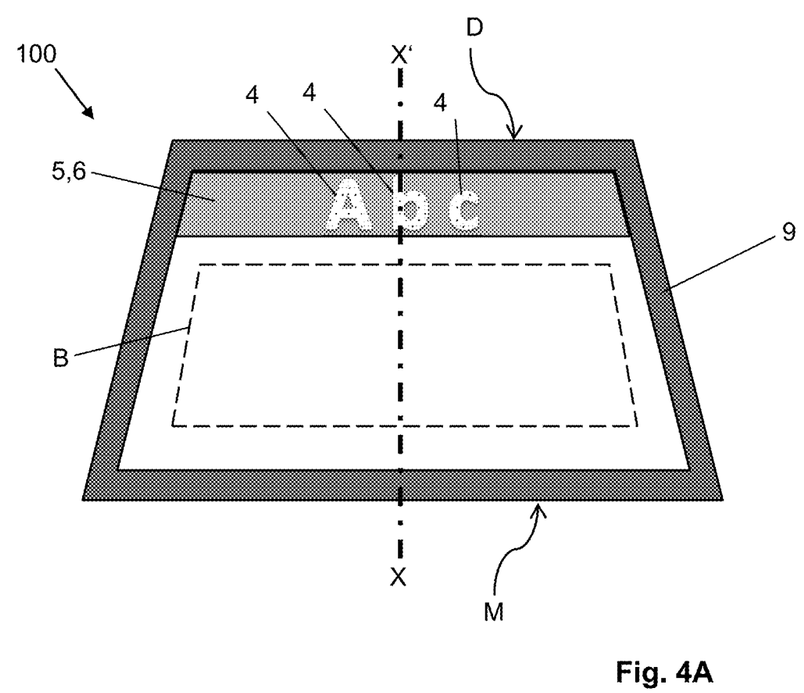
Figure 4B:
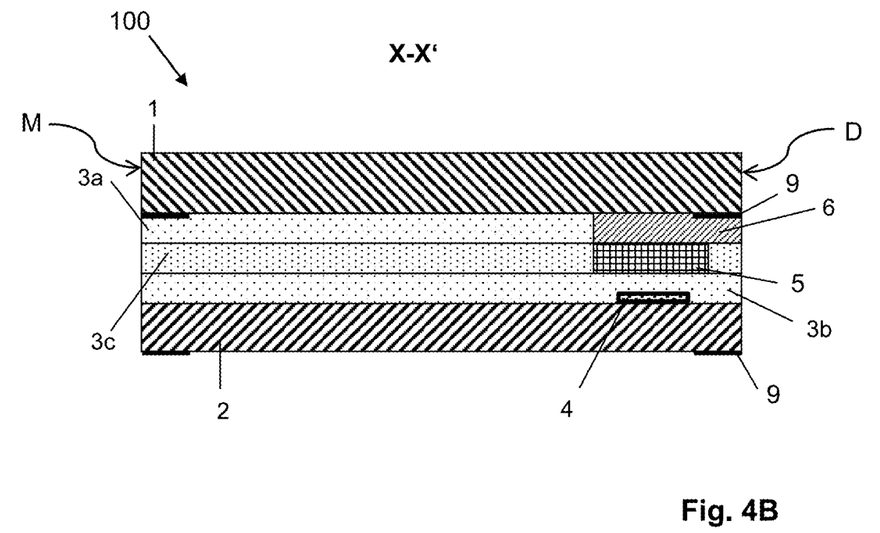

FIG. 4A and FIG. 4B depict in each case a detail of an alternative laminated pane 100 according to the invention as a windshield having an electrically controllable sun visor. The laminated pane 100 of FIGS. 4A and 4B corresponds substantially to the composite pane 100 of FIGS. 1A and 1B such that, in the following, only the differences are discussed.

The windshield comprises a trapezoidal laminated pane 100 with an outer pane 1 and an inner pane 2 that are joined to one another via two intermediate layers 3a, 3b. The outer pane 1 has a thickness of 2.1 mm and is made of green-colored soda lime glass. The inner pane 2 has a thickness of 1.6 mm and is made of clear soda lime glass. The windshield has an upper edge D facing the roof in the installed position and a lower edge M facing the engine compartment in the installed position.

The windshield is equipped with an electrically controllable functional element 5 as a sun visor that is arranged in a region above the central field of vision B (as defined in ECE-R 43). The sun visor is formed by a commercially available PDLC multilayer film as the functional element 5 that is embedded in the intermediate layers 3a, 3b. The height of the sun visor is, for example, 21 cm. The first intermediate layer 3a is bonded to the outer pane 1; the second intermediate layer 3b is bonded to the inner pane 2. A third intermediate layer 3c positioned therebetween has a cutout, into which the cut-to-size PDLC multilayer film is inserted precisely, i.e., flush on all sides. The third intermediate layer 3c thus forms, so to speak, a sort of passe-partout for the functional element 5, which is thus encapsulated all around in a thermoplastic material and is protected thereby.

The first intermediate layer 3a has a tinted region 6 that is arranged between the functional element 5 and the outer pane 1. The light transmittance of the windshield is thus additionally reduced in the region of the functional element and the milky appearance of the PDLC functional element 5 in the diffusive state is mitigated. The aesthetics of the windshield are thus significantly more attractive. The first intermediate layer 3a has, in the region 6, for example, average light transmittance of 30%, with which good results are achieved.

The region 6 can be homogeneously tinted. However, it is often visually more appealing if the tinting decreases in the direction of the lower edge of the functional element 5 such that the tinted and the non-tinted regions transition smoothly.

In the case depicted, the lower edges of the tinted region 6 and the lower edge of the PDLC functional element 5 (here, its side edges 5.1) are arranged flush. This is, however, not necessarily the case. It is also possible for the tinted region 6 to protrude beyond the functional element 5 or, vice versa, for the functional element 5 to protrude beyond the tinted region 6. In the latter case, it would not be the entire functional element 5 that would be bonded to the outer pane 1 via the tinted region 6.

The controllable functional element 5 is a multilayer film, consisting of an active layer 11 between two surface electrodes 12, 13 and two carrier films 14, 15. The active layer 11 contains a polymer matrix with liquid crystals dispersed therein, which align themselves as a function of the electrical voltage applied to the surface electrodes, as a result of which the optical properties can be controlled. The carrier films 14, 15 are made of PET and have a thickness of, for example, 0.125 mm. The carrier films 14, 15 are provided with a coating of ITO facing the active layer 11 and having a thickness of approx. 100 nm, forming the electrodes 12, 13. The electrodes 12, 13 can be connected to the vehicle's electrical system, via a bus bar (not shown) (formed, for example, by a silver-containing screen print) and via connecting cables (not shown).

The windshield has, as usual, a surrounding peripheral masking print 9 formed by an opaque enamel on the interior-side surfaces (facing the interior of the vehicle in the installed position) of the outer pane 1 and the inner pane 2. The distance of the functional element 5 from the upper edge D and the side edges of the windshield is less than the width of the masking print 9 such that the side edges of the functional element 5—with the exception of the side edge facing the central field of vision B— is concealed by the masking print 9. The electrical connections (not shown) are also expediently installed in the region of the masking print 9 and thus concealed.

In this example, the transparent body 4 is arranged between the inner pane 2 and the second intermediate layer 3b. Here, the transparent body 4 is printed on the surface of the inner pane 2 using a screen printing process and is made of glass frits that were fired on the inner pane 2. In other words, the glass frits (made of a glass whose melting point is lower than that of the inner pane 2) were printed onto the inner pane 2; then, the inner pane 2 together with the glass frits was heated above the softening temperature and glass frits were melted. After cooling, a permanently fixed bond developed between the printed glass frits and the pane surface. Such transparent bodies 4 made of glass have the particular advantage that they are very hard and exert a correspondingly large pressure difference on the functional element 5 in their edge area.

Here, the transparent body 4 has, for example, the form of the letters "A b c". It goes without saying that any other structures, letters, or markings can be printed using the screen printing process.

The outlines of the lettering "A b c" are again discreetly but clearly discernible for the human eye in all switching states of the functional element 5.

Figure 5A:
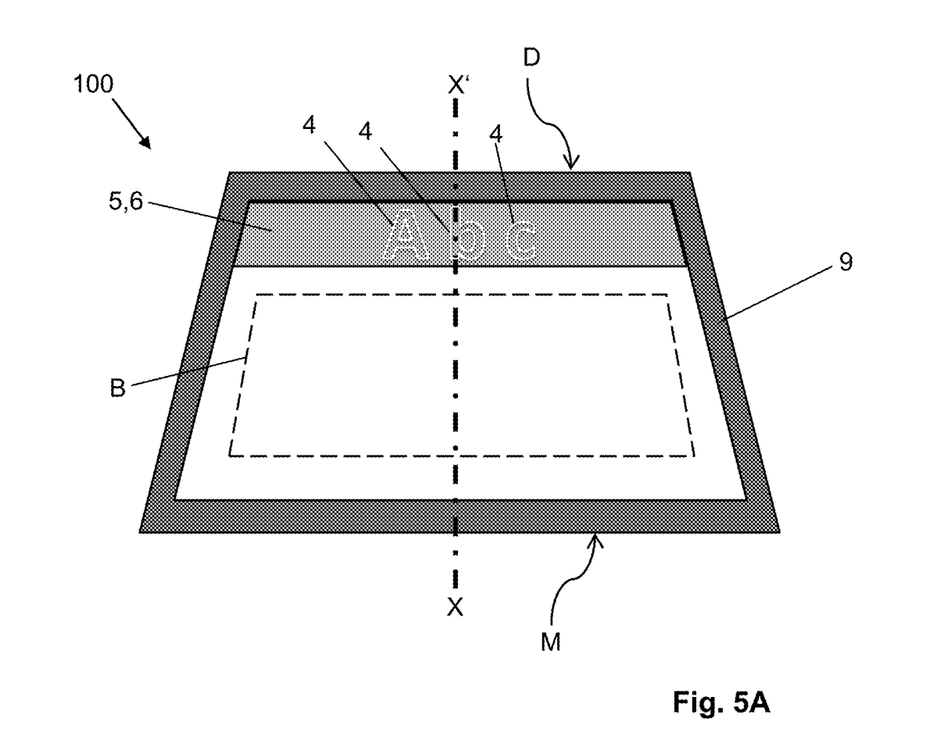
Figure 5B:
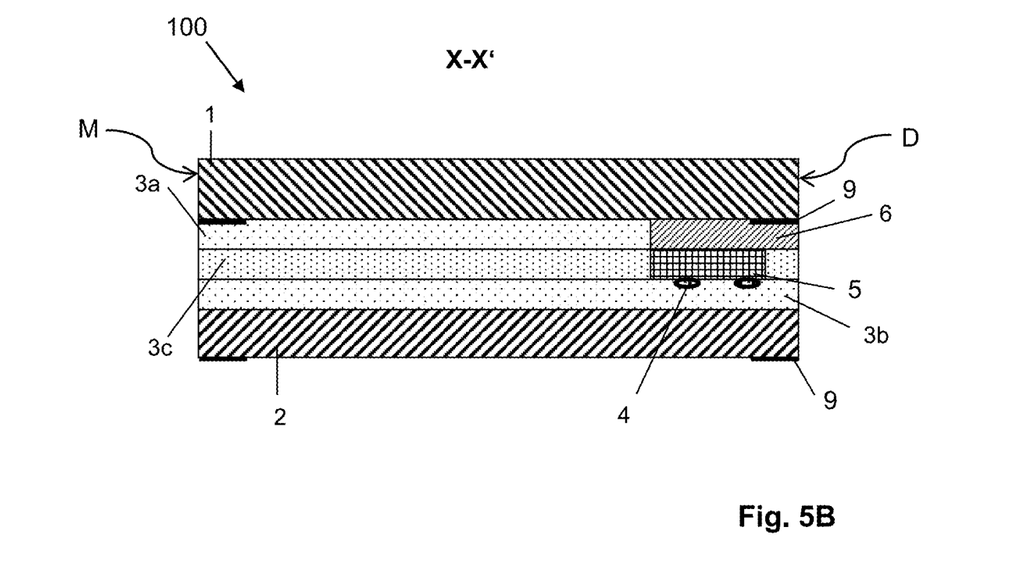

FIG. 5A and FIG. 5B depict in each case a detail of an alternative laminated pane 100 according to the invention as a windshield with an electrically controllable sun visor. The laminated pane 100 of FIGS. 5A and 5B essentially corresponds to the laminated pane 100 of FIGS. 4A and 4B such that only the differences are discussed in the following.

In contrast to the laminated pane 100 of FIGS. 4A and 4B, the transparent body 4 is not printed on; instead, it consists, for example, of three nylon threads (monofilaments) with a thickness of 100 µm that are inserted in the form of the outlines of the letters "A", "b" and "c" between the second intermediate layer 3b and the functional element 5. It goes without saying that by the insertion of a thread, any other outlines of shapes, letters, or markings can be introduced. It further goes without saying that the thread(s) can also be arranged between the inner pane 2 and the second intermediate layer 3b, between the outer pane 1 and the first intermediate layer 3a, between the first intermediate layer 3a and the functional element 5 or, optionally, between all the individual layers present. The transparent body 4 only has to be arranged, at least in sections, within the orthogonal projection area of the functional element 5 through the laminated pane 100 in order to achieve the desired effect according to the invention of influencing the scattering behavior of light on the functional element.

Figure 6:
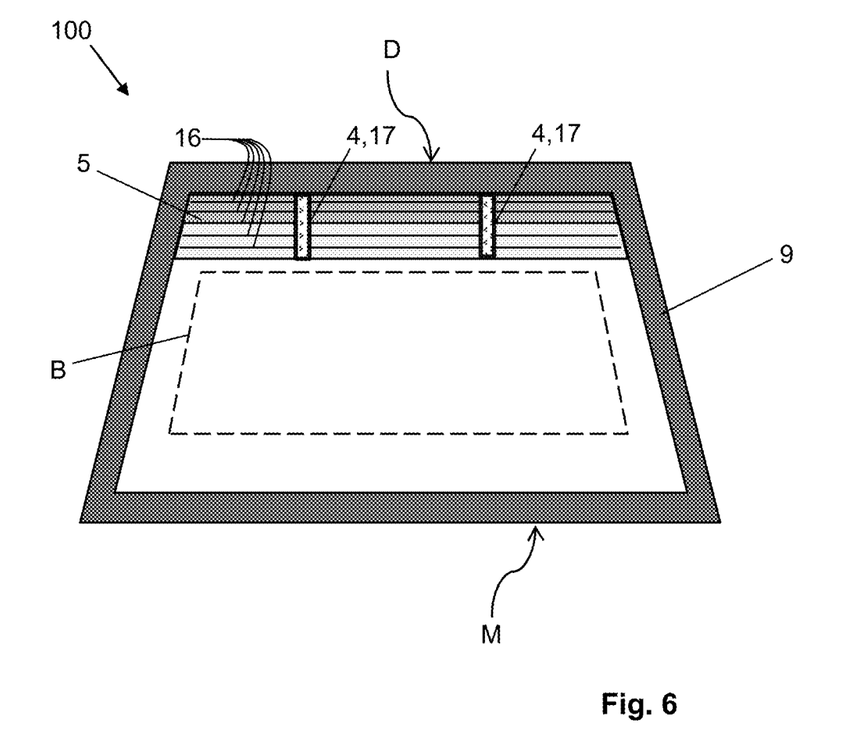

FIG. 6 depicts a plan view of another embodiment of a laminated pane 100 according to the invention as a windshield with an electrically controllable sun visor. The windshield and the functional element 5 as a controllable sun visor substantially correspond to the embodiment of FIG. 5A. The PDLC functional element 5 is, however, divided by horizontal isolation lines 16 into six strip-like segments. The isolation lines 16 have, for example, a width of 40 µm to 50 µm and are spaced 3.5 cm apart. They were introduced into the prefabricated multilayer film by laser. The isolation lines 16 separate, in particular, the electrodes 12, 13 into strips isolated from one another, which have in each case a separate electrical connection. The segments can thus be switched independently of one another. The thinner the isolation lines 16, the less conspicuous they are. Even thinner isolation lines 16 can be realized by etching.

The height of the darkened functional element 5 can be adjusted by the segmentation. Thus, depending on the position of the sun, the driver can darken the entire sun visor or even only part of it. The figure indicates that the upper half of the sun visor is darkened and the lower half is transparent.

In a particularly convenient embodiment, the functional element 5 is controlled by a capacitive switch area 17 arranged in the region of the functional element 5, wherein the driver determines the degree of darkening by the location at which he touches the pane. In the example depicted, two transparent bodies 4 are arranged congruently with two likewise segmented, capacitive switching surfaces 17 (for example, two segmented, electrically conductive strips that are connected to suitable evaluation electronics).

Alternatively, the functional element 5 can also be controlled by contactless methods, for example, by gesture recognition, or as a function of the state of the pupil or eyelid determined by a camera and suitable evaluation electronics.

Another aspect of the invention includes a laminated pane (100) with a functional element (5) with electrically controllable optical properties, comprising:
  a laminated stack sequence composed of an outer pane (1), a first intermediate layer (3a), a second intermediate layer (3b), and an inner pane (2), and
  a functional element (5) with electrically controllable optical properties, which is arranged, at least in sections, between the first intermediate layer (3a) and the second intermediate layer (3b),
  wherein at least one transparent body (4) is arranged, in sections, between the outer pane (1) and the functional element (5) and/or between the inner pane (2) and the functional element (5).

Another aspect of the invention includes a laminated pane (100) with a functional element (5) with electrically controllable optical properties, comprising:
  a laminated stack sequence composed of an outer pane (1), a first intermediate layer (3a), a second intermediate layer (3b), and an inner pane (2), and
  a functional element (5) with electrically controllable optical properties, which is arranged, at least in sections, between the first intermediate layer (3a) and the second intermediate layer (3b),
  wherein at least one transparent body (4) is arranged, in sections, between the outer pane (1) and the functional element (5) and/or between the inner pane (2) and the functional element (5), and the transparent body (4) is arranged completely within the orthogonal projection region of the functional element (5) through the laminated pane (100).

LIST OF REFERENCE CHARACTERS 1 outer pane
2 inner pane 3a first intermediate layer
3b second intermediate layer
4 transparent body
5 functional element with electrically controllable optical properties
5.1,5.2,5.3,5.4 side edge of the functional element 5
6 tinted region of the first intermediate layer 3a
9 masking print
11 active layer of the functional element 5
12 surface electrode of the functional element 5
13 surface electrode of the functional element 5
14 carrier film
15 carrier film
16 isolation lines
17 capacitive sensor
100 laminated pane
A area of the transparent body
B central field of vision of the windshield
D upper edge of the windshield, roof edge
M lower edge of the windshield, engine edge
X-X' section line
Z enlarged region

The invention claimed is:

1. A laminated pane with a functional element with electrically controllable optical properties, comprising:
   a laminated stack sequence composed of an outer pane, a first intermediate layer, a second intermediate layer, and an inner pane, and
   a functional element with electrically controllable optical properties, which functional element is arranged, at least in sections, between the first intermediate layer and the second intermediate layer,
   wherein at least one transparent body is arranged between the outer pane and the functional element and/or between the inner pane and the functional element in sections, wherein the transparent body has transmittance in the visible light spectrum of more than 30%, wherein the transparent body is arranged completely within a through-vision region of the functional element through the laminated pane, wherein the transparent body contains a transparent film and/or a transparent fiber and/or a transparent layer applied by screen printing or 3D printing, and wherein an area A of the transparent body is less than or equal to 50% of an area of the functional element.

2. The laminated pane according to claim 1, wherein the transparent body is arranged between the functional element and the first intermediate layer and/or between the functional element and the second intermediate layer.

3. The laminated pane according to claim 1, wherein the transparent body consists of a transparent film, or wherein the transparent body consists of a transparent fiber.

4. The laminated pane according to claim 3, wherein the film or the fiber contains or is made of polyethylene terephthalate (PET), ethylene vinyl acetate (EVA), polyvinyl butyral (PVB), polyurethane (PU), polyamide, polyimide, or polyvinylidene fluoride.

5. The laminated pane according to claim 1, wherein the transparent body consists of a transparent layer applied by screen printing or 3D printing.

6. The laminated pane according to claim 1, wherein the transparent body is clear or has a tint or a coloration.

7. The laminated pane according to claim 1, wherein the stack sequence is laminated in an autoclave method, a vacuum bag method, a vacuum ring method, a calendar method, by means of vacuum laminators, or combinations thereof.

8. The laminated pane according to claim 1, wherein the thickness of the transparent body is from 5 μm to 500 μm.

9. The laminated pane according to claim 1, wherein the transparent body is a polyethylene terephthalate (PET) film with a thickness greater than or equal to 100 μm.

10. The laminated pane according to claim 1, wherein the functional element is a PDLC (polymer dispersed liquid crystal) film.

11. The laminated pane according to claim 1, wherein the transparent film is a polymeric transparent film.

12. The laminated pane according to claim 2, wherein the transparent body is arranged only between the functional element and the first intermediate layer or only between the functional element and the second intermediate layer.

13. The laminated pane according to claim 3, wherein the transparent film is a transparent polymeric film.

14. The laminated pane according to claim 5, wherein the transparent layer is made of glass, polymer, or resin.

15. The laminated pane according to claim 1, wherein the area A of the transparent body is less than or equal to 10% of the area of the functional element.

16. A method for producing a laminated pane according to claim 1, comprising:
   a) arranging an outer pane, a first intermediate layer, a functional element with electrically controllable optical properties, a second intermediate layer, and an inner pane one above another in this order, wherein at least one transparent body is arranged between the outer pane and the first intermediate layer, between the first intermediate layer and the functional element, between the functional element and the second intermediate layer, and/or between the second intermediate layer and the inner pane, and
   b) joining the outer pane and the inner pane by lamination.

17. The method according to claim 16, wherein in step a) the transparent body is arranged between the first intermediate layer and the functional element or between the functional element and the second intermediate layer.

18. The method according to claim 16, wherein in step b) the lamination is carried out by an autoclave method, a vacuum bag method, a vacuum ring method, a calendar method, by means of vacuum laminators, or a method combined therefrom.

19. A method comprising utilizing a transparent body in a laminated pane according to claim 1 for inscribing, for marking.

* * * * *